United States Patent
Agbay

[11] Patent Number: 5,871,030
[45] Date of Patent: Feb. 16, 1999

[54] CURB BOX LOCKING DEVICE

[75] Inventor: Anthony J. Agbay, Auburn, Mass.

[73] Assignee: Inner-Tite Corp., Holden, Mass.

[21] Appl. No.: 923,170

[22] Filed: Sep. 4, 1997

[51] Int. Cl.[6] .................................................. F16K 37/00
[52] U.S. Cl. ........................ 137/364; 137/371; 137/382; 137/327
[58] Field of Search .................................. 137/364, 371, 137/382, 327

[56] References Cited

U.S. PATENT DOCUMENTS

| | | | |
|---|---|---|---|
| 135,822 | 2/1873 | Laforge | 137/371 |
| 148,102 | 3/1874 | Williamson et al. | 137/371 |
| 969,776 | 9/1910 | Foley | 137/371 |
| 1,229,429 | 6/1917 | Farley | 137/229 |
| 1,458,391 | 6/1923 | Burton | 137/371 |
| 1,629,797 | 5/1927 | Knittel . | |
| 1,850,040 | 3/1932 | Turner . | |
| 1,903,581 | 4/1933 | Turner | 137/382 |
| 2,993,616 | 7/1961 | Carlile, Jr. et al. . | |
| 3,227,183 | 1/1966 | Hecht | 137/364 |
| 3,653,410 | 4/1972 | West | 138/89 |
| 3,797,286 | 3/1974 | Saporito | 70/169 |
| 4,461,597 | 7/1984 | Laurin | 137/371 |
| 4,462,430 | 7/1984 | Anthony et al. | 138/89 |
| 4,503,880 | 3/1985 | Hockman | 137/377 |
| 4,506,529 | 3/1985 | Armbruster, Jr. et al. | 70/168 |
| 4,625,765 | 12/1986 | O'Donnell et al. | 138/89 |
| 4,712,586 | 12/1987 | McCauley et al. | 138/89 |
| 4,747,453 | 5/1988 | Howard, Sr. | 52/20 |
| 4,993,260 | 2/1991 | Bednarz | 285/32 |
| 5,234,029 | 8/1993 | Thomas et al. | 137/364 |

*Primary Examiner*—A. Michael Chambers
*Attorney, Agent, or Firm*—Samuels, Gauthier, Stevens & Reppert

[57] ABSTRACT

A curb box locking device has a core unit with a head at its upper end and a foot at its lower end. A sleeve surrounds and is shiftable axially in relation to the core unit. Claw members are carried on the core unit for pivotal movement through side openings in the sleeve. The locking device is externally configured and dimensioned to be lowered into the curb box to a position at which the foot of the core unit is at rest on a valve or the like at the bottom of the curb box. The sleeve is engageable with the claw members during upward displacement of the sleeve relative to the core unit to pivotally urge the claw members radially outwardly into extended positions engaging the interior of the curb box to thereby resist upward removal of the locking device. The locking device is upwardly removable from the curb box by employing a tool specially designed to pull upwardly on the core unit.

14 Claims, 13 Drawing Sheets

CURB BOX LOCKING DEVICE

BACKGROUND OF THE INVENTION

1. Field of the Invention

This invention relates generally to locking devices, and is concerned in particular with an improved lock for preventing unauthorized access to a utility valve or the like located at the bottom of a curb box.

2. Description of the Prior Art

As shown for example by U.S. Pat. No. 135,822 (Laforge); U.S. Pat. No. 1,229,429 (Farley) and U.S. Pat. No. 5,234,029 (Thomas et al.), curb box locks are conventionally located at ground level. Locks of this type are easily accessible and thus prone to being picked, broken or otherwise compromised by those seeking unauthorized access to valves located at the bottom of the curb boxes.

The objective of the present invention is to provide an improved lock which can be dropped into the curb box, and which is not readily removable from the curb box without employing a tool specially designed for that purpose.

SUMMARY OF THE INVENTION

The locking device of the present invention includes a core unit surrounded by an axially shiftable sleeve. The core unit has a specially configured tip protruding above the sleeve, and claw members pivotal through side openings in the sleeve. The locking device is externally configured and dimensioned to be dropped into the curb box to a position resting on the valve to be protected from unauthorized access. The locking device is removable vertically from the curb box by employing a tool specially designed to grip the specially configured protruding tip of the core unit. Any attempt to otherwise remove the locking device, as by pulling upwardly on the sleeve, will be prevented by the claw members being pivotally urged outwardly into engagement with the interior of the curb box.

These and other features and advantages of the present invention will become more apparent as the description proceeds with reference to the accompanying drawings, wherein:

DETAILED DESCRIPTION OF THE ILLUSTRATED EMBODIMENTS

With reference initially to FIGS. 1–3A, a conventional tubular curb box 10 is shown extending downwardly from ground level 12 to a valve 14 in a utility conduit 16 for the supply of gas, water, etc. A removable cap 17 closes off the top of the curb box. The cap 17 is secured in place by a screw 18 threaded into an underlying radially protruding boss 19 on a collar at the top of the curb box 10.

A locking device in accordance with one embodiment of the present invention is generally depicted at 20. As can best be seen in FIG. 3, the locking device includes a core unit having a body 22 connected to a foot 24 by an intermediate shaft 26. The body has an upper cone-shaped tip 28, and is slotted as at 30 to accommodate a pair of claw members 32 mounted for rotation on a cross pin 34. The tip 28 is circumscribed by a groove 36. As can be best seen in FIG. 3, each claw member 32 has a straight upper edge 32a, a curved cam surface 32b and a jagged nose 32c.

Figures 3, 3A:
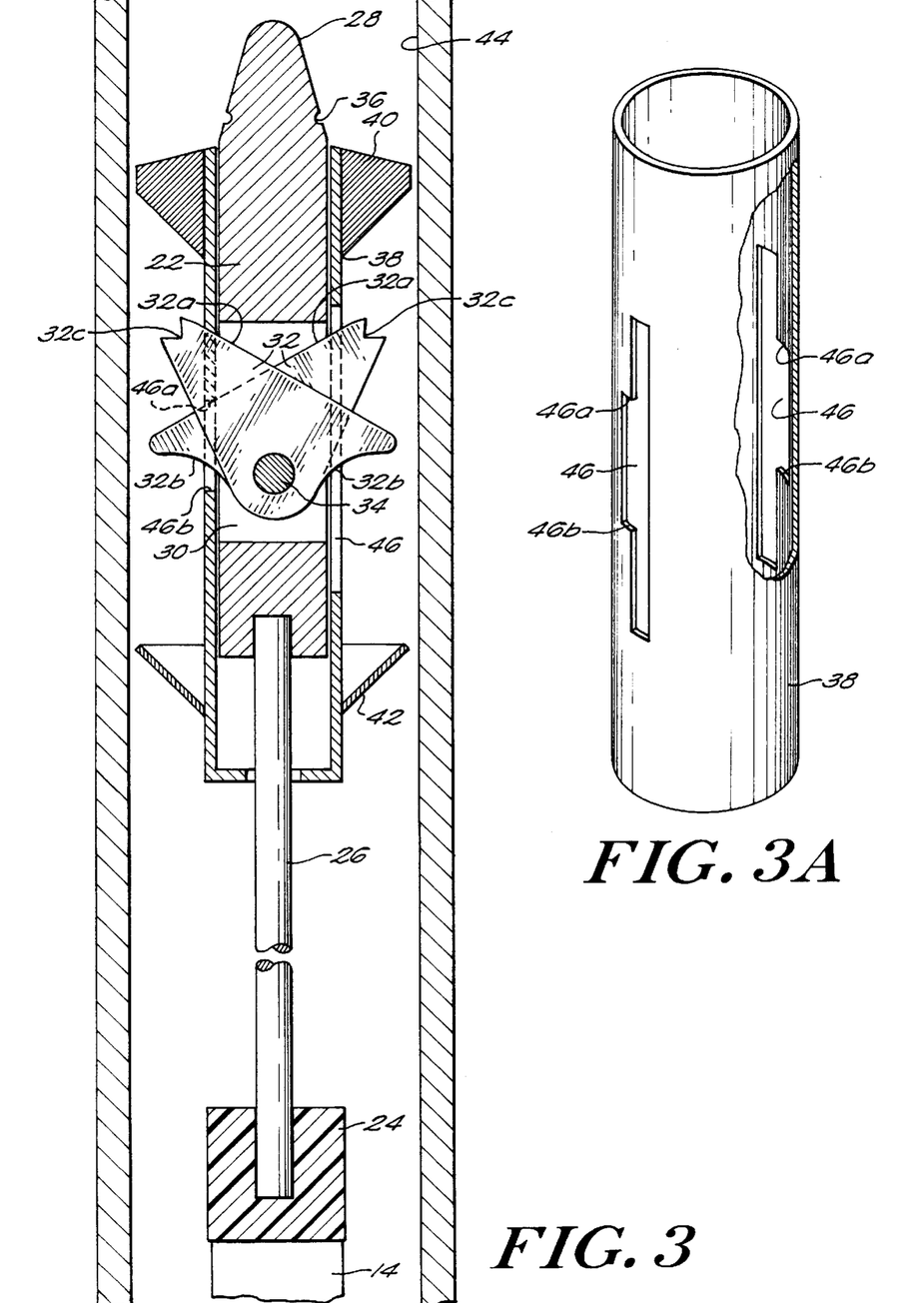
FIG. 3 is a vertical sectional view through the locking device shown in FIG. 1.
FIG. 3A is a three dimensional view of the outer sleeve of the first embodiment, with portions broken away.

An outer sleeve 38 surrounds and is axially shiftable with respect to the core unit. The sleeve 38 is surrounded adjacent its upper end by a solid heavy duty collar 40. A second collar 42 is located at the lower end of the sleeve. The collars 40, 42 are dimensioned to fit closely within the interior surface 44 of the curb box 10, and to thus slidingly guide the locking device as it is dropped downwardly to a position at which its foot 24 rests on the valve 14. Upper collar 40 is recessed as at 41 to allow the locking device to pass by the inwardly protruding boss 19 at the upper end of the lock box.

The outer sleeve 38 has oppositely facing side openings 46 aligned with and through which the claw members 32 protrude. One edge of each side opening 46 has a stepped configuration defining upper and lower ledges 46a, 46b.

Figure 1:
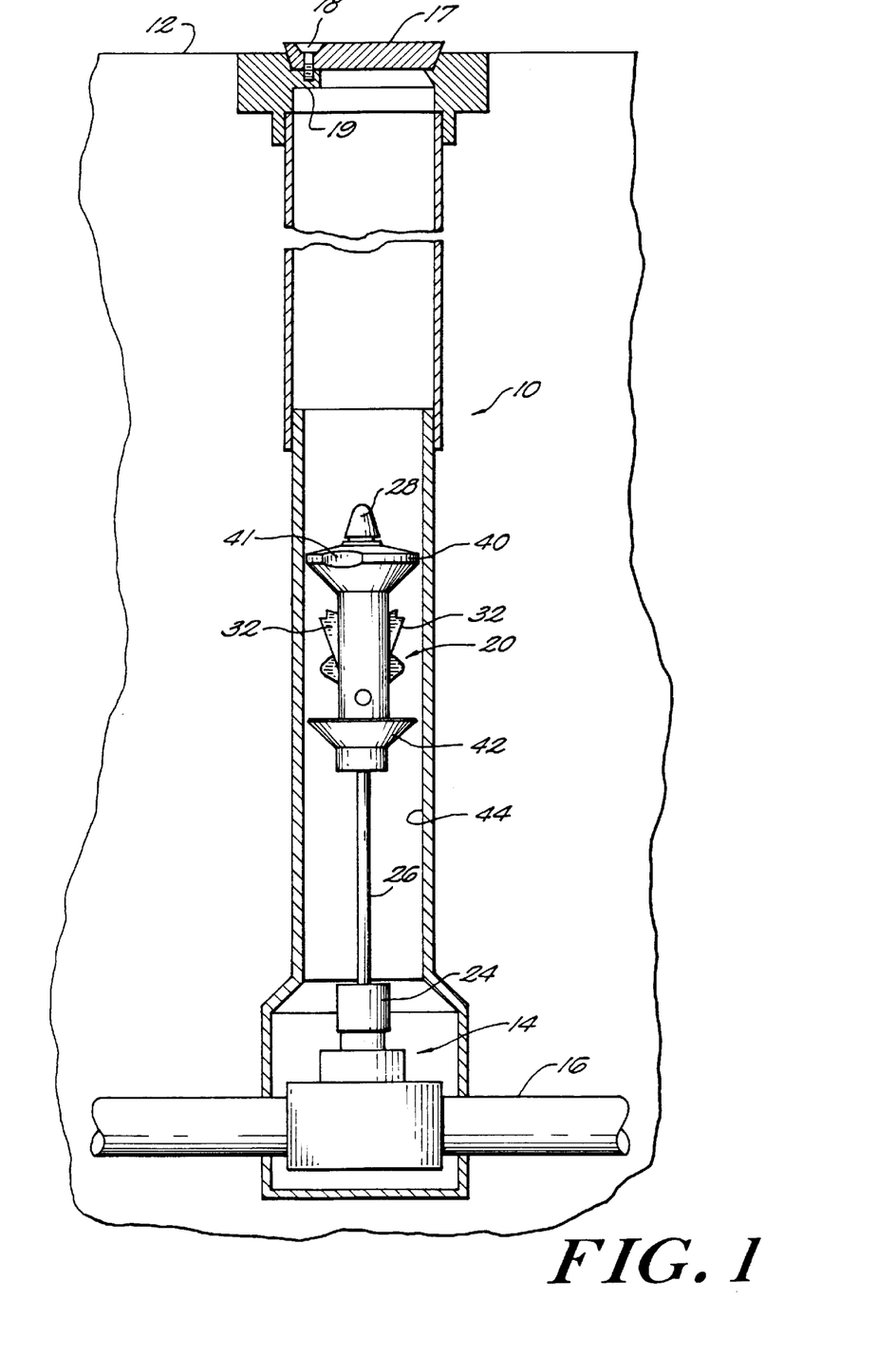
FIG. 1 is a vertical sectional view taken through a conventional curb box and showing a locking device in accordance with a first embodiment of the present invention at rest on the valve to be protected from unauthorized access.
Figures 2, 5:
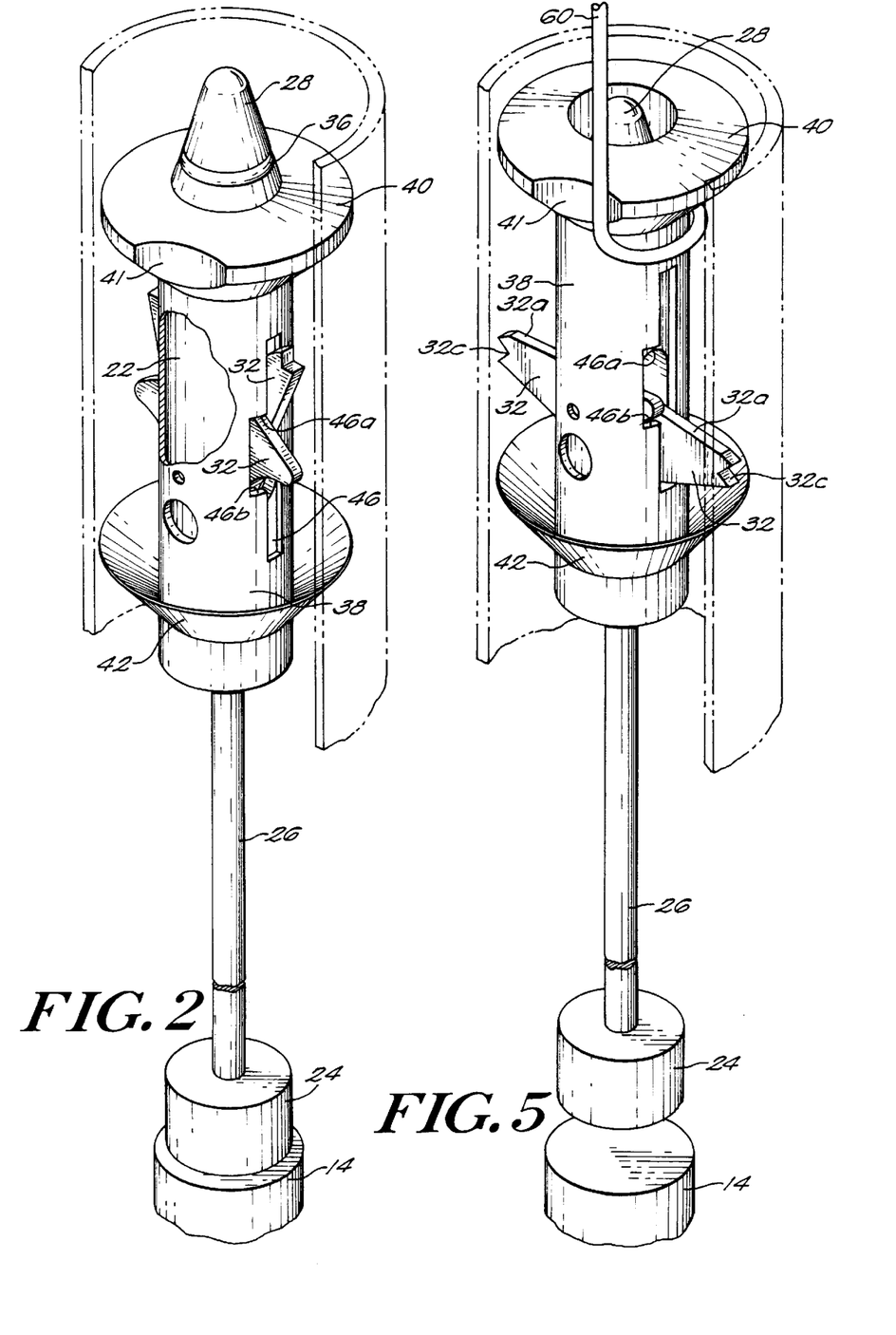
FIG. 2 is a three dimensional view of the locking device as depicted in FIG. 1, with the curb box broken away and shown by broken lines.
FIG. 5 is a three dimensional view of the locking device as depicted in FIG. 4, again with the curb box broken away and shown by broken lines.

When the locking device is at rest on the valve 14, as shown in FIGS. 1–3, the sleeve 38 is at its lowermost position, with the ledges 46a of the side openings 46 acting on the upper edges 32a of the claw members 32 to bias the claw members into retracted positions, with the jagged noses 32c spaced inwardly from the interior surface 44 of the curb box 10. The upper collar 40 coacts with the interior surface 44 to isolate the valve 14 from unauthorized access from above.

Figure 7:
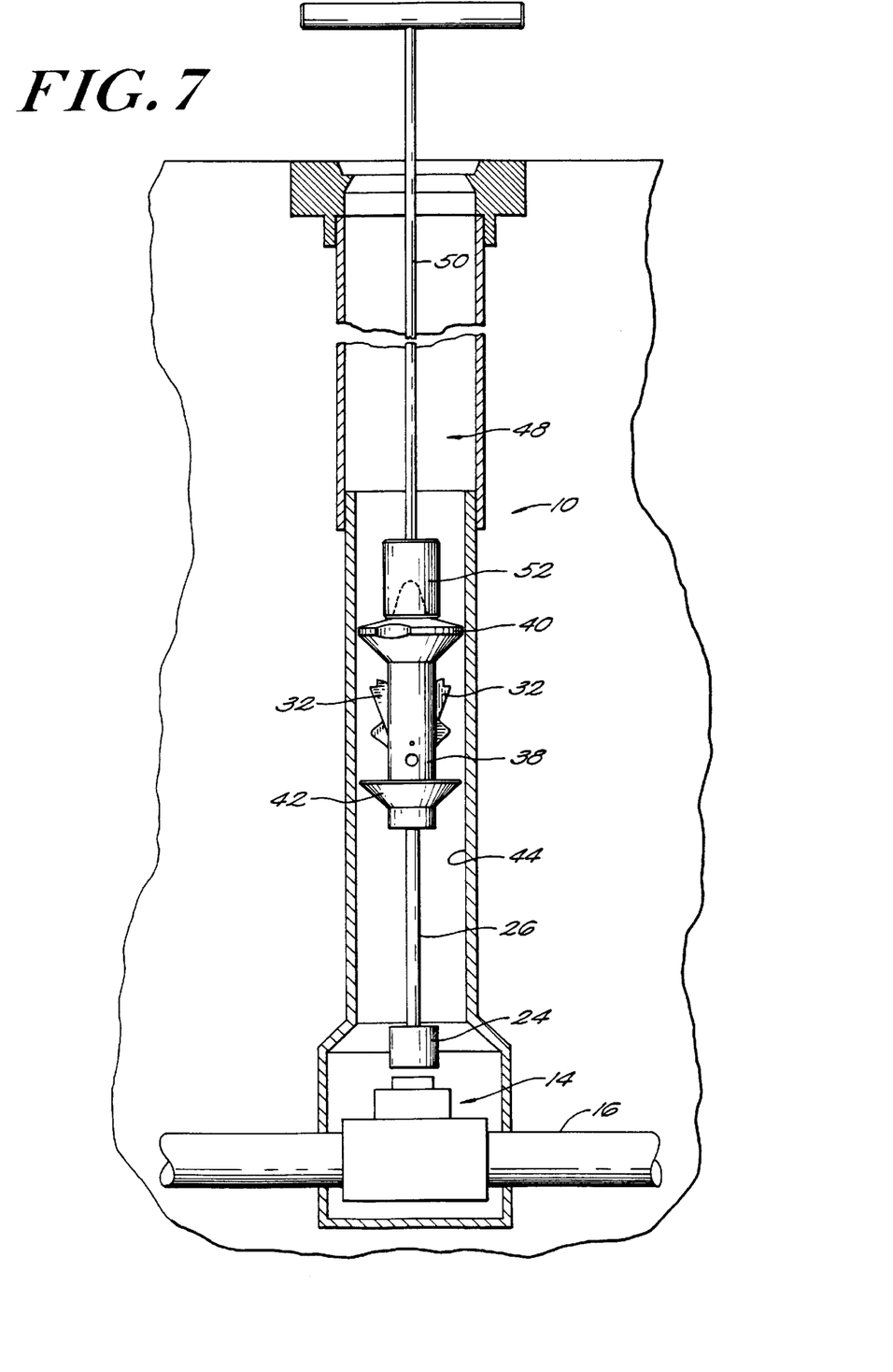
FIG. 7 is a view similar to FIG. 1 showing authorized removal of the locking device by use of a specially designed tool.
Figure 8:
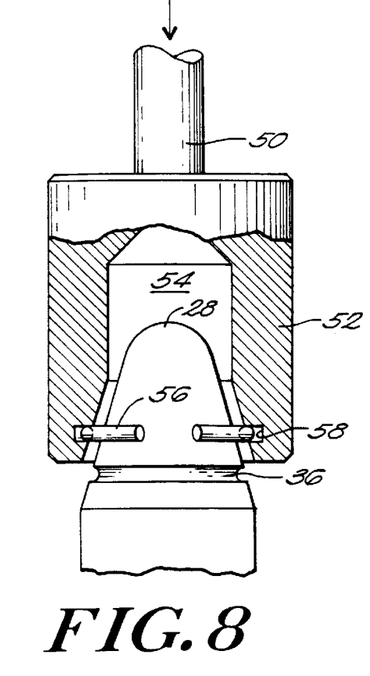
FIGS. 8 and 9 are sequential views showing how the tool of FIG. 7 grips the upwardly protruding tip of the locking device.
Figure 9:
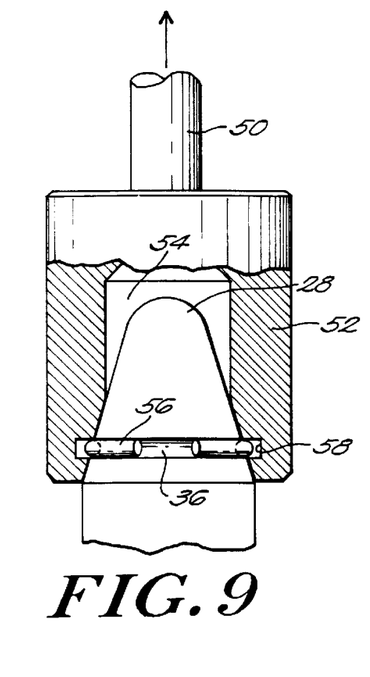

Removal of the locking device 20 may be accomplished with a specially designed tool of the type shown at 48 in FIG. 7. The tool has a long handle 50 with a head 52 at its lower end. As shown in FIGS. 8 and 9, the head 52 has an internal recess 54 configured to receive the cone-shaped tip 28 on the core unit of the locking device. A split ring 56 seated in an internal groove 58 in the recess 54 slides over the conical surface of the tip (as shown in FIG. 8) and ultimately snaps into the groove 36 (as shown in FIG. 9) to mechanically interlock the head 52 to the tip 28. Thereafter, the handle 50 can be pulled upwardly to extract the locking device from the curb box. Because the upward force is being exerted via the tip 28 on the core unit, with the sleeve 38 remaining in its lowered position with respect to the core unit, the upper ledges 46a of the openings 46 will continue to bear down on the upper edges 32a of the claw members 32, thereby retaining the claw members in their retracted positions spaced inwardly from the interior surface 44 of the curb box.

Figure 4:
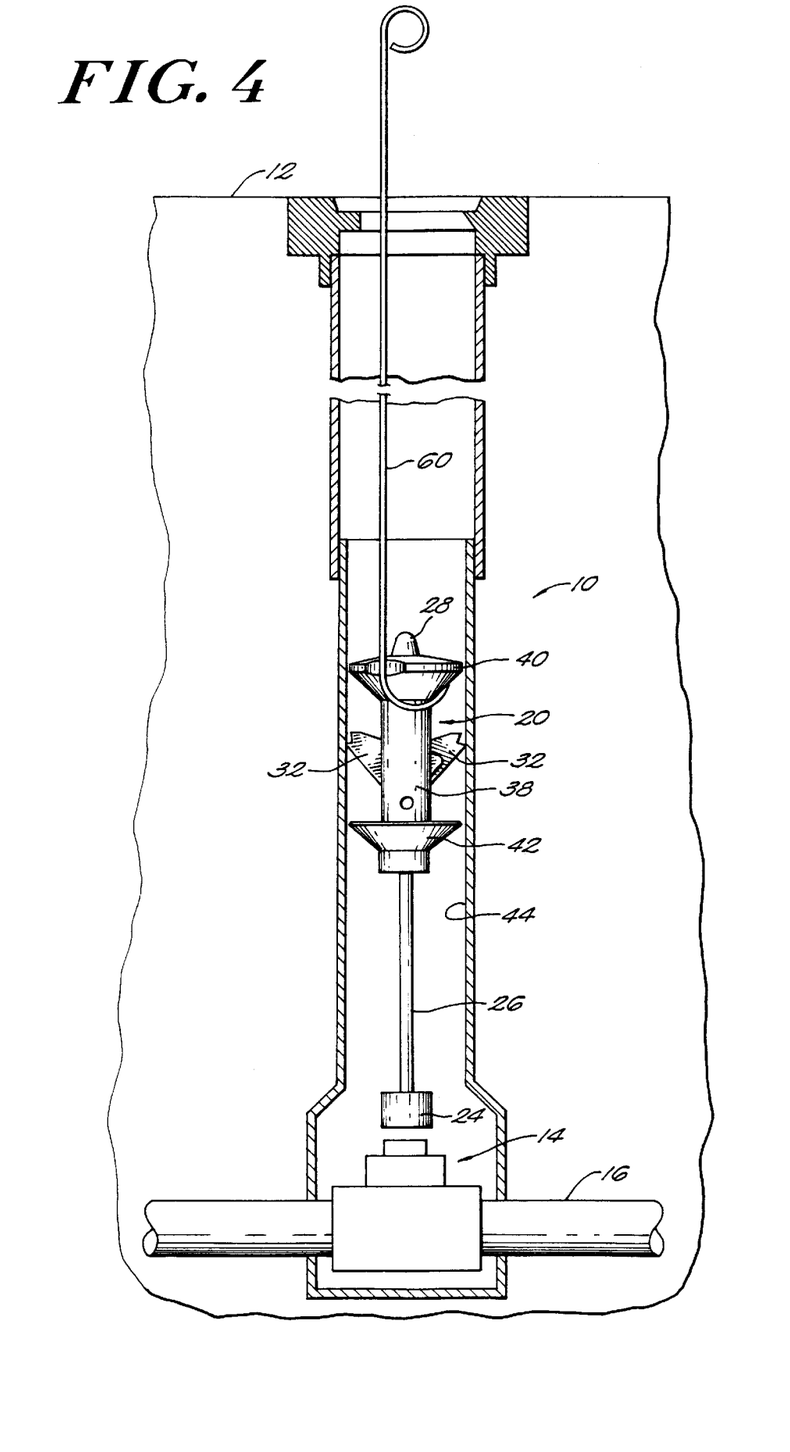
FIG. 4 is a view similar to FIG. 1 depicting a foiled attempt at unauthorized removal of the locking device.
Figure 6:
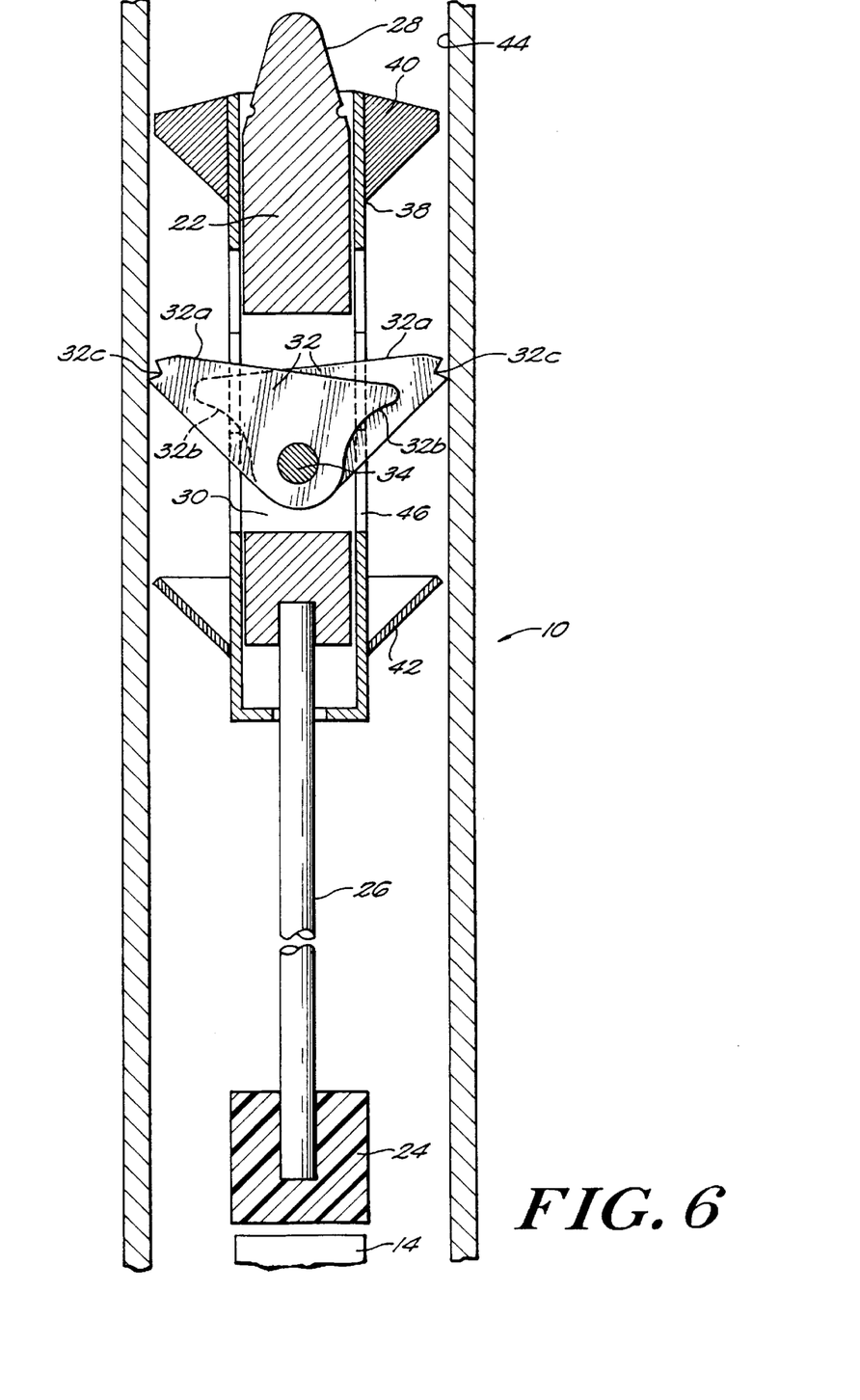
FIG. 6 is a vertical sectional view taken through the locking device as depicted in FIGS. 4 and 5.

In the event that an unauthorized attempt is made to remove the locking device, as for example by pulling the collar 40 upwardly with a pick 60 as shown in FIGS. 4 and 5, upward shifting of the collar with respect to the core unit will result in the upper ledges 46a of the side openings 46 being elevated from the upper edges 32a of the claw members 32, leaving the claw members free to rotate outwardly about the cross pin 34 and resulting in their jagged noses 32c engaging the interior curb box surface 44. Continued elevation of the collar 40 and its integral sleeve 38 relative to the core unit will eventually bring the lower edges 46b of the openings 46 into contact with the cam surfaces 32b of the claw members 32, resulting in the jagged noses 32c being jammed against the interior curb box surface 44, thereby preventing further upward removal of the locking device.

A second alternative embodiment of a locking device in accordance with the present invention is depicted at 62 in FIGS. 10 to 16. The locking device 62 has a core unit again including a body 64 connected to a foot 66 by an intermediate shaft 68. The body is slotted as at 70 to accommodate a pair of claw members 72 mounted for rotation about a cross pin 74. Each claw member has an upper edge 72a, a curved cam surface 72b and a jagged nose 72c. An outer sleeve 76 surrounds and is axially shiftable in relation to the body 64. As can best be seen in FIG. 11A, sleeve 76 is provided with side openings 78 formed with ledges 80. The claw members 72 protrude through the side openings 78, and as can best be seen in FIG. 11B, the ledges 80 underlie the cam surfaces 72b of the claw members 72. Upper and lower collars 82, 84 again surround and are integral with the sleeve 76. The collars 82, 84 coact in sliding contact with the interior curb box surface 44 to guide the locking device as it is dropped into the curb box, ultimately to come to rest with its foot 66 supported on the valve 14.

Figure 10:
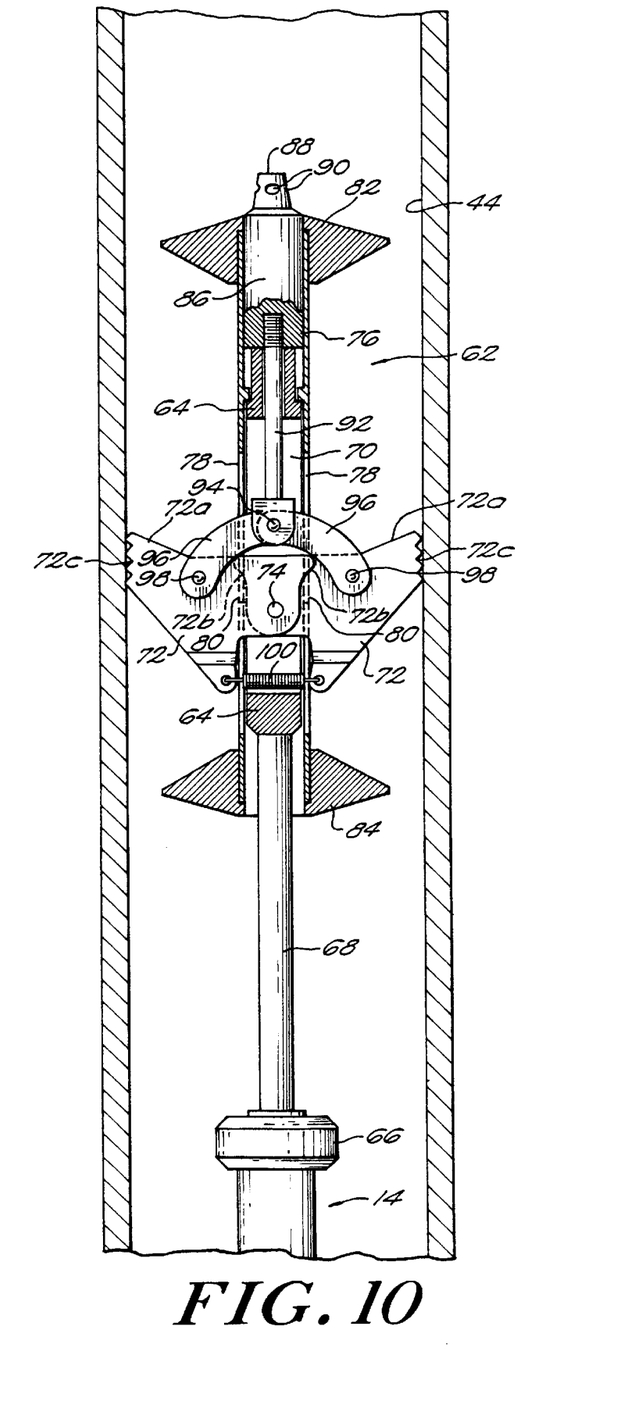
FIG. 10 is a vertical sectional view through a second embodiment of a locking device in accordance with the present invention, shown at rest on a valve at the bottom of a curb box.
Figures 11A, 11B:
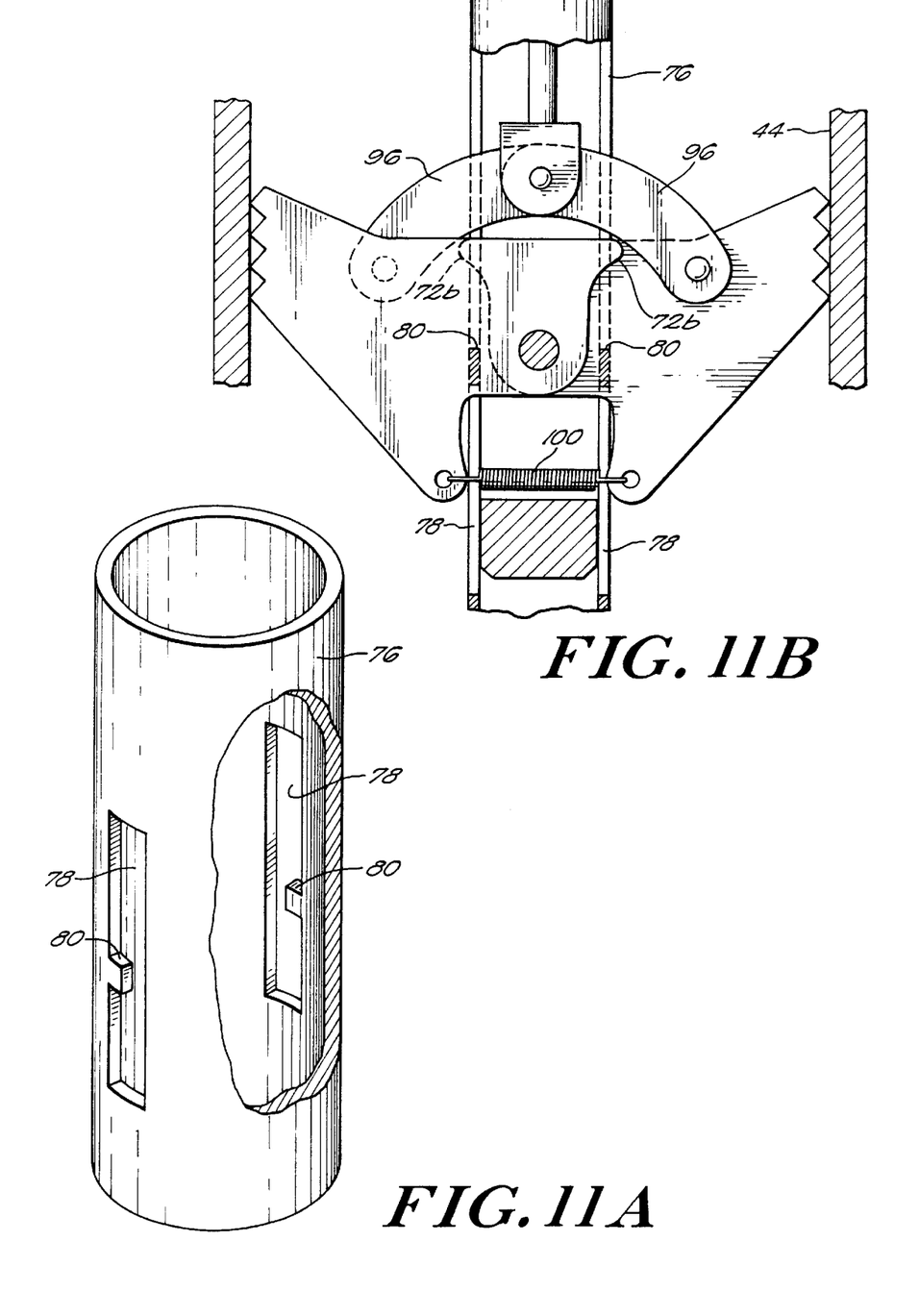
FIG. 11A is a three dimensional view of the outer sleeve of the second embodiment, with portions broken away.
FIG. 11B is an enlarged view of the claw members and their relationship to the ledges in the side openings of the outer sleeve.

The core unit further includes a head 86 axially shiftable in relation to both the body 64 and the surrounding sleeve 76. The head has an upwardly protruding conical tip 88 interrupted by dimples 90. A pin 92 extends downwardly from the head 86 through the upper end of body 64 to the slot 70 for pivotal connection at 94 with a pair of links 96, each link in turn being pivotally connected at 98 to one of the claw members 72.

A spring 100 interconnects lower ends of the claw members and serves to rotatably bias the claw members outwardly, thereby pressing their jagged noses 74c into contact with the interior curb box surface 44.

Any attempt to vertically extract the locking device 62 from the curb box by pulling upwardly on the outer sleeve 76 via collar 82 will cause the ledges 80 to bear upwardly on the cam surfaces 72b of the claw members, thus adding to the biasing action of the spring 100 to further jam the jagged noses 72c into the interior curb box surface 44.

Figure 12:
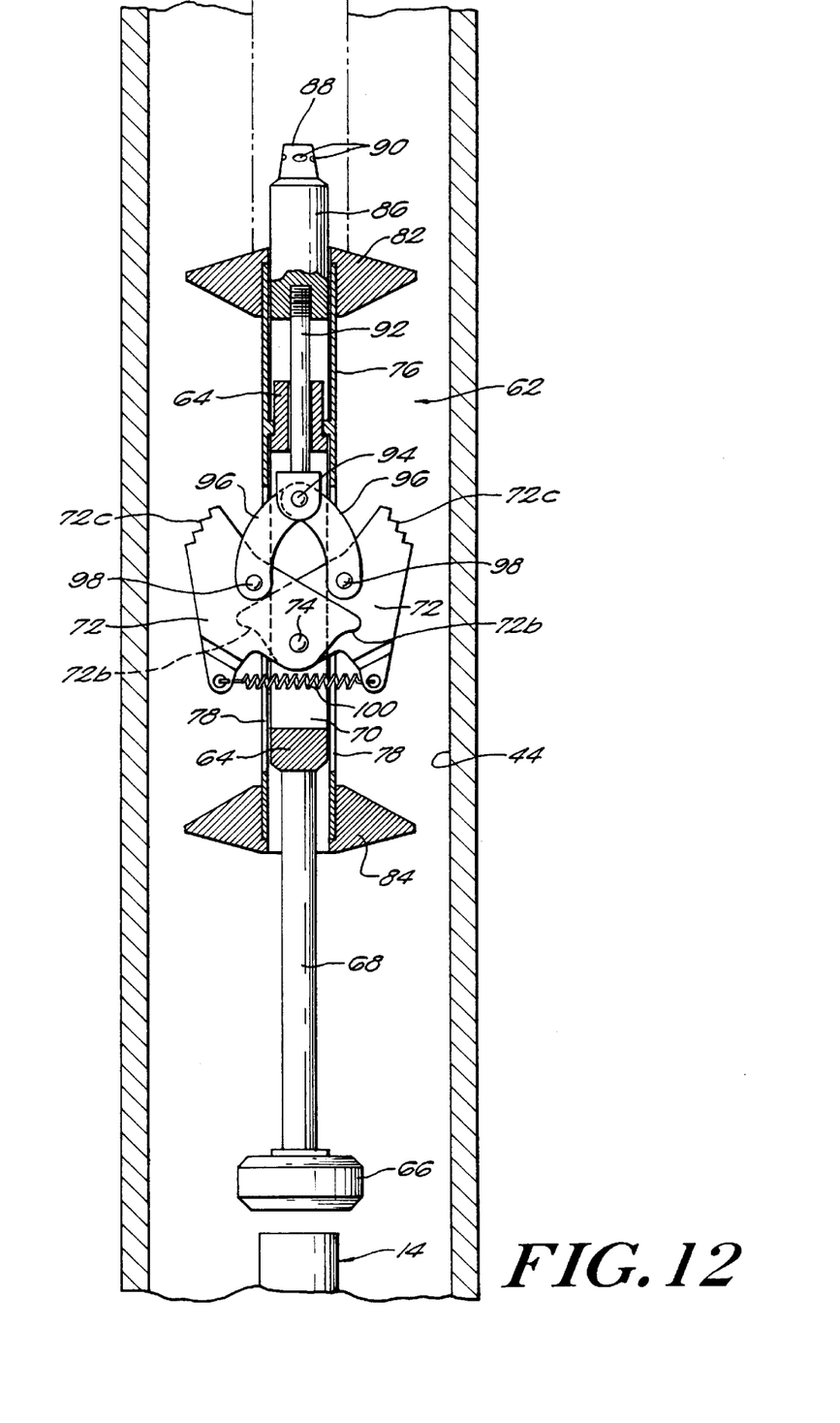
FIG. 12 is a view similar to FIG. 10 showing the locking device being removed in an authorized manner by use of a specially designed tool.

In order to remove the locking device, and as shown in FIG. 12, the head 86 is pulled upwardly in relation to both the body 64 and sleeve 76, thereby acting via pin 92 and links 96 to overcome the biasing action of spring 100, causing the claw members to collapse inwardly and away from the interior curb box surface 44. The entire unit can then be pulled upwardly.

Removal of the locking device is accomplished with the tool 102 depicted in FIGS. 13 to 16. The tool includes an outer tube 104 containing an inner sleeve 106, which in turn contains a rod 108. The lower end of rod 108 tapers outwardly and has an end recess 110 shaped to receive the upwardly protruding tip 88 on the head 86 of the locking device. The wall of the recess 110 has apertures containing balls 112 urged inwardly into locked positions by the surrounding tapered inner surface of sleeve 106.

The sleeve 106 and rod 108 are provided respectively with mutually spaced handles 114, 116 protruding outwardly through a slot 118 in the outer tube 104. The tube 104 and sleeve 106 are further provided with mutually spaced brackets 120, 122, with bracket 120 being pivotally connected at 124 to a lever 126, and with the lever 126 being pivotally connected at 128 to a link 130 which in turn is pivotally connected at 132 to bracket 122. A spring 134 is located between an enlarged diameter head 136 of the rod 108 and an interior shelf 138 on sleeve 106.

Figure 13:
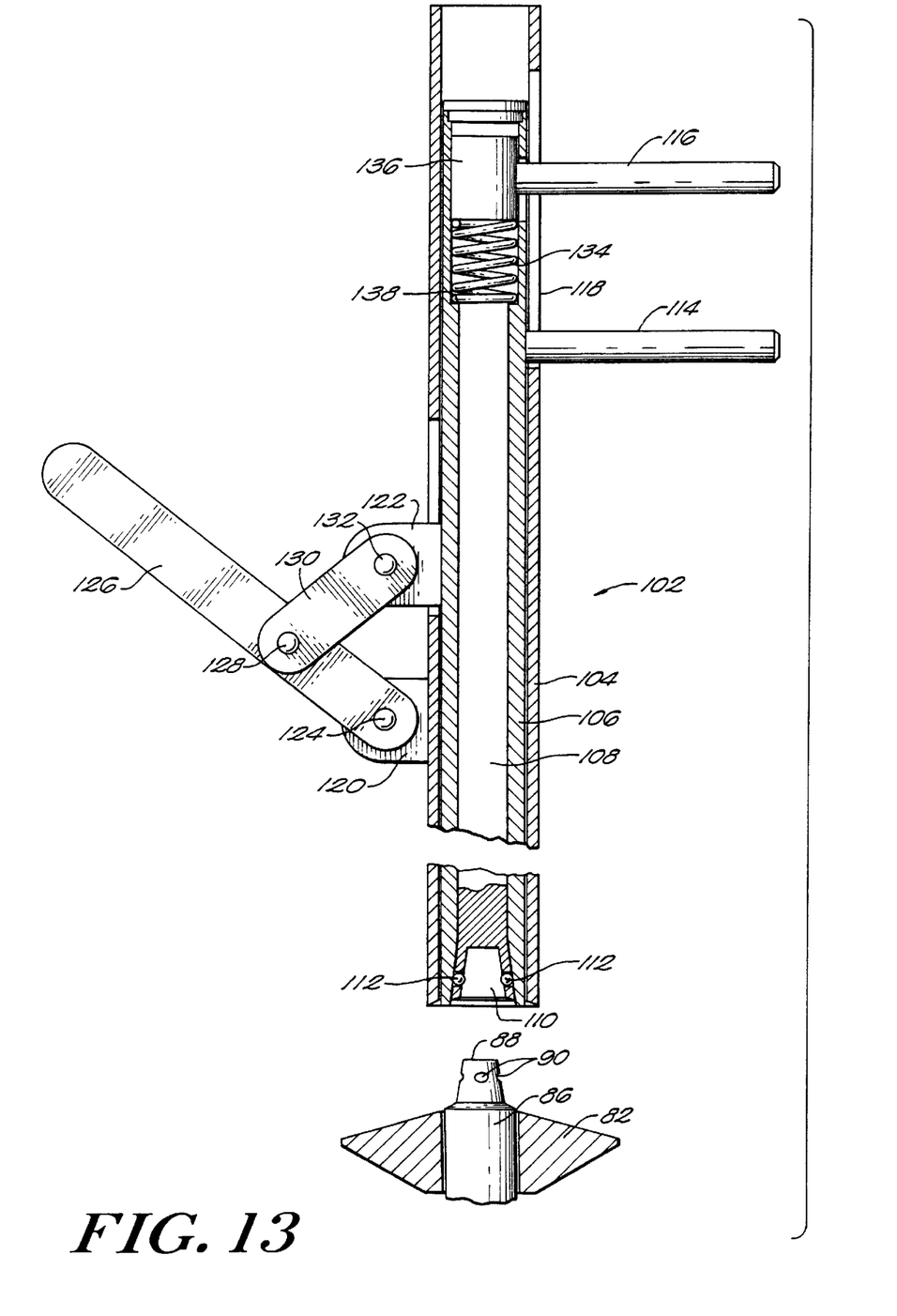
FIGS. 13–16 are sequential views depicting the operation of a tool employed to remove the locking device shown in FIGS. 10–12.
Figure 14:
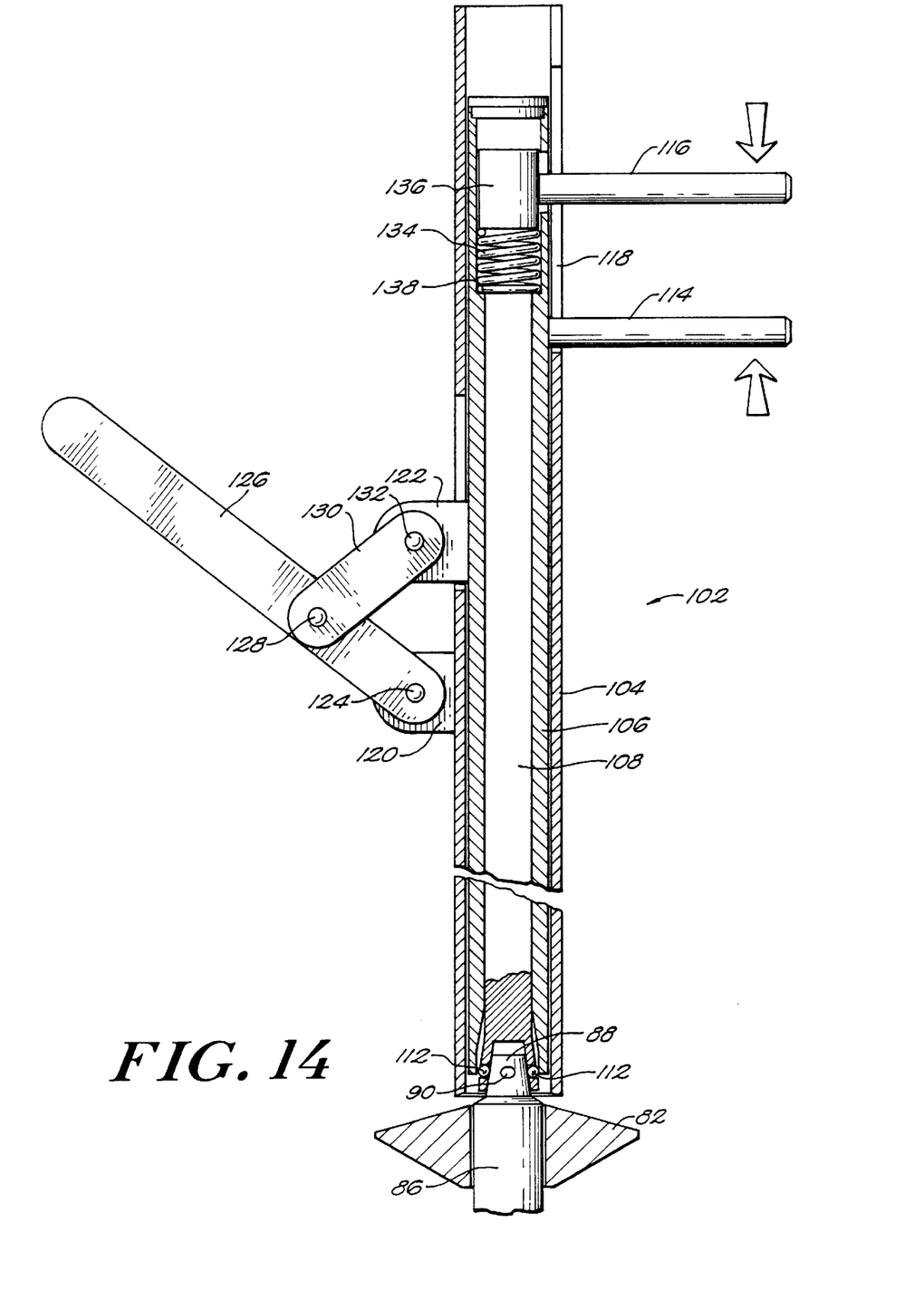
Figure 15:
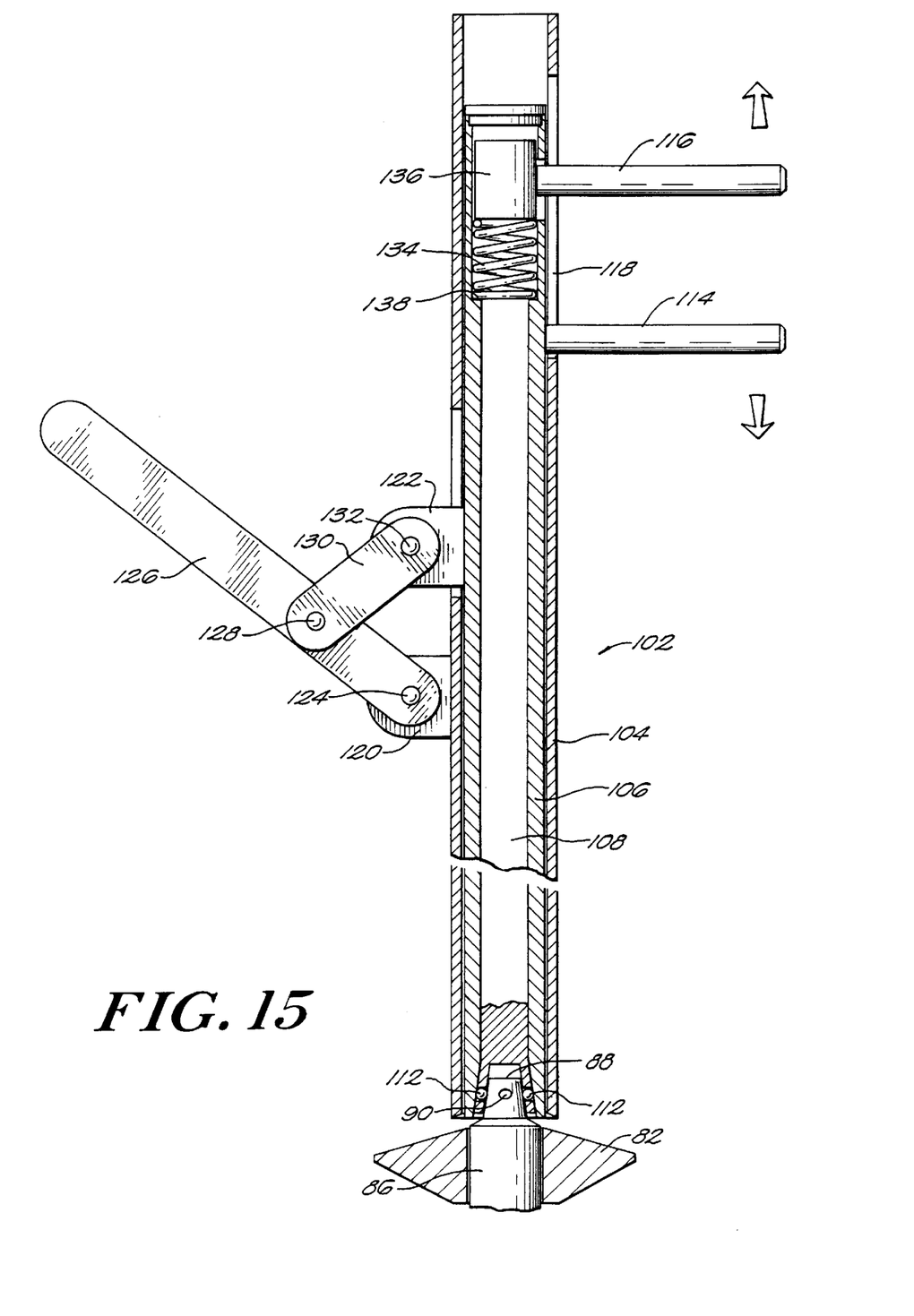
Figure 16:
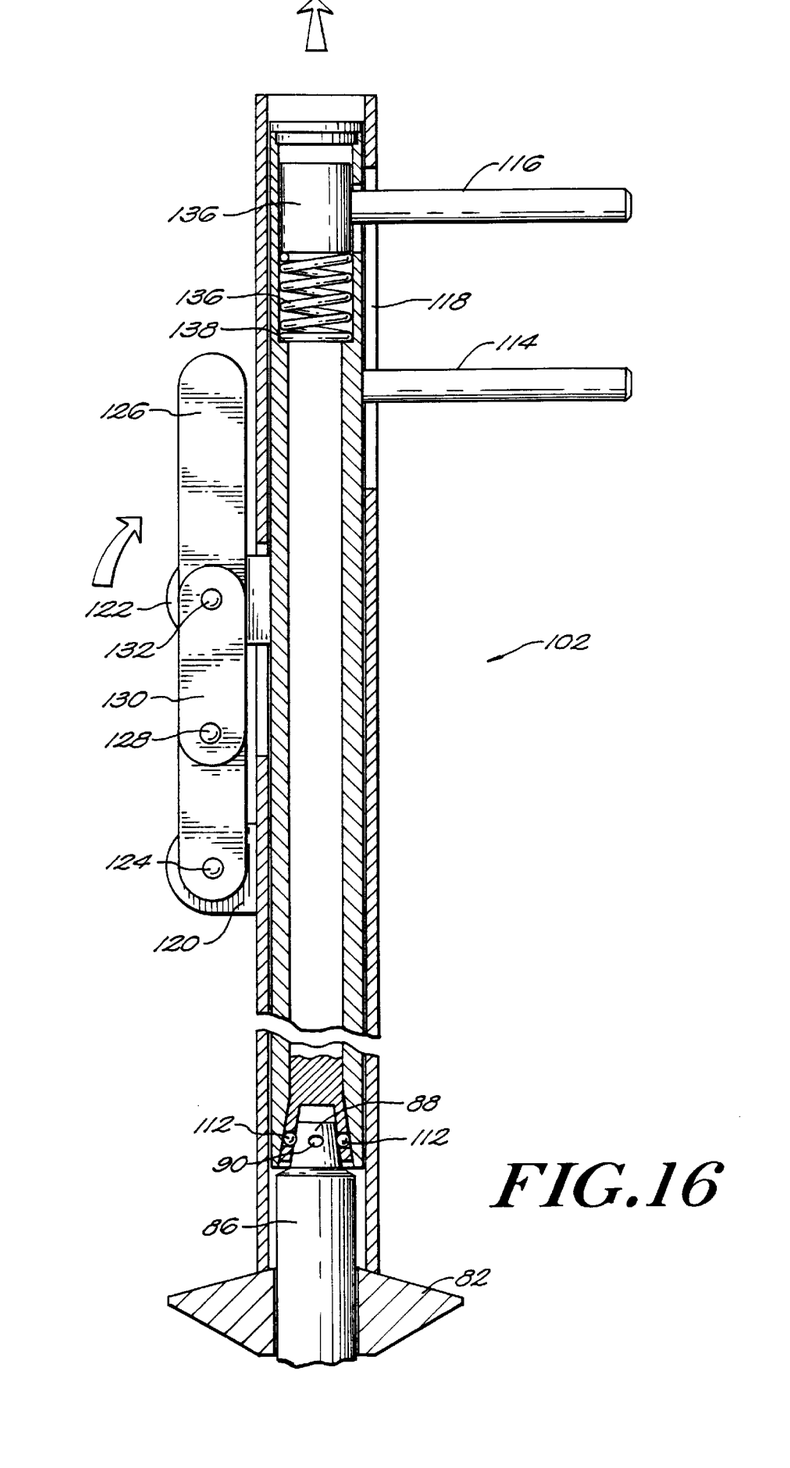

In the condition shown in FIG. 13, the tool is in a free state, with the balls 112 urged inwardly into locked positions. By urging the handles 114, 116 together, as shown in FIG. 14, the spring 134 is compressed as the end of the rod 108 projects outwardly from the sleeve 106 to unlock the balls 112. This allows the upwardly protruding tip 88 of the locking device 62 to enter the recess 110, with the balls 112 being received in the dimples 90. As shown in FIG. 15, the handles 114, 116 are then allowed to move apart under the influence of the expanding spring 134, causing the balls 112 to be locked into the dimples 90. As shown in FIG. 16, lever 126 is then actuated to pull head 86 upwardly with respect to the upper sleeve collar 82, which as previously noted, causes the claw members 72 to collapse inwardly away from the interior curb box surface 44. The tool can then be pulled upwardly to extract the locking device 62 from the curb box.

In light of the foregoing, it will be seen that both embodiments of the present invention provide locking devices that can be dropped into the curb box to safeguard the underlying valve from unauthorized access. Both embodiments are designed to thwart their extrication by any means other than a tool specially designed for that purpose.

The position of the groove 36 in the tip 28 of the first embodiment can be shifted vertically, necessitating a corresponding change to the design of the tool head 52. A similar result can be achieved by shifting the elevations or changing the number of the dimples 90 in the tip 88 of the second embodiment. In this way, different locking devices can be supplied to different utilities, with each utility having its own tools designed to operate only its locking devices.

I claim:

1. A locking device for blocking unauthorized access to a valve or the like located at the bottom of a curb box, said device comprising:

a core unit having a head at its upper end and a foot at its lower end;

a sleeve surrounding said core unit, said sleeve having side openings and being shiftable axially in relation to said core unit; and claw members carried on said core unit for pivotal movement through the side openings in said sleeve, said locking device being externally configured and dimensioned to be lowered into said curb box to a position at which the foot of said core unit is at rest on said valve, said sleeve being engageable with said claw members during upward displacement of said sleeve relative to said core unit to pivotally urge said claw members radially outwardly into extended positions engaging the interior of said curb box to thereby resist upward removal of said locking device, said locking device being upwardly removable from said curb box by pulling upwardly on said core unit.

2. The locking device as claimed in claim 1 further comprising an exterior collar on said sleeve at a location above said side openings and below the upper end of said core unit, said collar projecting radially from said sleeve to coact in sliding engagement with the interior of said curb box to locate said locking device centrally in said curb box.

3. The locking device of claim 1 further comprising a second exterior collar projecting radially from said sleeve at a location beneath said side openings.

4. The locking device of claim 2 wherein said claw members extend beyond the periphery of said collar when in said extended positions.

5. The locking device of claim 4 wherein said claw members are pivotally moveable between said extended positions and retracted positions within the periphery of said collar.

6. The locking device of claim 5 wherein said claw members are urged into said retracted positions by said sleeve being lowered with respect to said core unit, and wherein said claw members are urged into said extended positions by said sleeve members being raised with respect to said core unit.

7. The locking device of claim 1 wherein said head had a generally conical configuration.

8. The locking device as claimed in claim 1 further comprising means for resiliently biasing said claw members into said extended positions.

9. The locking device as claimed in claim 8 wherein said core unit includes a body located between said head and said foot and on which said claw members are pivotally mounted, said head being axially separable from said body, and means for mechanically coupling said head to said claw members in a manner such that axial separation of said head from said body will be accompanied by retraction of said claw members from said extended positions.

10. A locking device for a curb box, comprising:

a core unit having claw members pivotally mounted thereon; and a sleeve surrounding said core unit and having side openings aligned with said claw members, said device being externally configured and dimensioned to be lowered vertically to a position at rest within said curb box, and being removable vertically from said curb box by pulling upwardly on said core unit, said sleeve being engageable with said claw members in response to upward movement of said sleeve relative to said core unit to thereby pivotally urge said claw members outwardly into engagement with the interior of said curb box.

11. For use with a locking device for blocking unauthorized access to a valve or the like located at the bottom of a curb box, said locking device being configured and dimensioned to be lowered into the curb box to a position at rest on said valve, and having an exposed cone-shaped tip with an external recess protruding upwardly from a radially outwardly extending collar, a tool for vertically removing said locking device from said curb box, said tool comprising:

a handle of a length sufficient to access said locking device by reaching down into said curb box from ground level;

a head at the lower end of said handle, said head having a recess configured to receive said tip therein; and engagement means associated with said head for coacting with the external recess on said tip to mechanically couple said head to said tip, thereby permitting removal of said locking device by pulling upwardly on said handle.

12. The tool as claimed in claim 11 wherein said external recess comprises a groove circumscribing said tip, and wherein said engagement means comprises a split ring carried by said head and configured to snap engage into said groove.

13. The tool as claimed in claim 11 wherein said external recess comprises at least one concave depression, and wherein said engagement means comprises at least one ball member configured to protrude into said depression.

14. The tool as claimed in claim 11 wherein said tip is shiftable axially with respect to said collar between a lowered position causing elements of said locking device to engage said curb box and thereby prevent upward removal of said locking device, and a raised position freeing said elements from engagement with said curb box, and wherein the head of said tool is surrounded by a sleeve engageable with said collar, said head being axially shiftable relative to said sleeve to raise said tip in relation to said collar from said lowered position to said raised position.

* * * * *